United States Patent [19]
Bland

[11] Patent Number: 6,054,416
[45] Date of Patent: Apr. 25, 2000

[54] DRILLING FLUIDS COMPRISING BIODEGRADABLE HETEROPOLYGLYCOLS

[75] Inventor: Ronald G. Bland, Houston, Tex.

[73] Assignee: Baker Hughes Incorporated, Houston, Tex.

[21] Appl. No.: 09/074,112

[22] Filed: May 7, 1998

[51] Int. Cl.[7] ............................................. C09K 7/02
[52] U.S. Cl. ..................... 507/136; 507/261; 507/925; 507/905; 507/110; 507/111; 507/112; 507/113; 507/114; 507/115
[58] Field of Search ...................... 507/136, 139, 507/261, 266, 925, 905, 110, 111, 112, 113, 114, 115

[56] References Cited

U.S. PATENT DOCUMENTS

| | | | |
|---|---|---|---|
| 3,639,233 | 2/1972 | Schultz et al. | 507/136 |
| 4,830,765 | 5/1989 | Perricone et al. | 507/261 |
| 5,057,234 | 10/1991 | Bland et al. | 507/136 |
| 5,229,017 | 7/1993 | Nimerick et al. | 507/261 |
| 5,622,921 | 4/1997 | Dyer | 507/261 |
| 5,783,526 | 7/1998 | Dobson, Jr. et al. | 507/261 |

FOREIGN PATENT DOCUMENTS

| | | |
|---|---|---|
| 0652271A1 | 5/1995 | European Pat. Off. . |
| 2252993 | 8/1992 | United Kingdom . |
| 2297775A | 8/1996 | United Kingdom . |
| 2304354A | 3/1997 | United Kingdom . |
| 2319047A | 5/1998 | United Kingdom . |

*Primary Examiner*—Philip Tucker
*Attorney, Agent, or Firm*—Paula D. Morris & Associates, P.C

[57] ABSTRACT

A fluid selected form the group consisting of a drilling, a drill-in, and a completion fluid, said fluid comprising a substantially linear heteropolyglycol in an amount effective to perform a function selected from the group consisting of polymer stabilization, shale stabilization, and a combination thereof. The fluid preferably comprises water as a continuous phase, and the heteropolyglycol preferably consists essentially of monomers selected from the group consisting of ethylene oxide and linear alpha-omega alkylene diols.

20 Claims, No Drawings

DRILLING FLUIDS COMPRISING BIODEGRADABLE HETEROPOLYGLYCOLS

FIELD OF THE INVENTION

The present invention relates to drilling, drill-in, and completion fluids, preferably water-base fluids, which comprise substantially linear heteropolyglycols.

BACKGROUND OF THE INVENTION

One type of fluid used in oil and gas well drilling operations is a "completion fluid." A completion fluid is pumped down a well after drilling is completed during the "completion phase." Drilling mud typically is removed from the well using "completion fluid," which typically is a clear brine. Then, the equipment required to produce fluids to the surface is installed in the well. A completion fluid must have sufficient viscosity to maintain the filter cake and sufficient elasticity to maintain a suspension of bridging or weighing agents.

Other types of fluids used during drilling operations are "drill-in" and "drilling" fluids. A drill-in fluid is pumped through the drill pipe while drilling through the "payzone," or the zone believed to hold recoverable oil or gas. A drilling fluid is used to drill a borehole through the earth to reach the payzone. Typically a drilling mud is circulated down through the drill pipe, out the drill bit, and back up to the surface through the annulus between the drill pipe and the borehole wall. The drilling fluid has a number of purposes, including cooling and lubricating the bit, carrying the cuttings from the hole to the surface, and exerting a hydrostatic pressure against the borehole wall to prevent the flow of fluids from the surrounding formation into the borehole.

Fluids in which water is the continuous phase provide the fastest drilling rates, and are ecologically favored over fluids in which oil is the continuous phase. Unfortunately, water does not have the viscosity profile suitable to carry drill solids to the surface from any significant depth. In addition, the walls of a wellbore frequently are composed at least in part of shale. When exposed to water, many shales swell, slough, or spall to the extent that they may even prevent further operation of the wellbore. Bits of shale may slough off during gravel transport, mix with the gravel, and drastically reduce the effectiveness of well completion by choking off the permeability of the gravel pack, as well as by causing screen blinding.

Water-soluble polymers, such as partially hydrolyzed polyacrylamides ("PHPA's"), starches, derivatized starches, gums, derivatized gums, and cellulosics, typically are used to thicken water-base fluids, and in part to synergistically stabilize shale. The water-soluble polymers provide the viscosity necessary to lift drilled solids from the wellbore, and tend to provide extremely fast drilling rates. However, the shear stresses in the immediate vicinity of the drill bit are high enough to degrade most water-soluble polymers, resulting in lowered viscosity.

Polyglycols are known to stabilize the water-soluble polymers, and to stabilize shale. Monomers of propylene oxide (specifically 1,2-propylene oxide) and butylene oxide (specifically 1,2-butylene oxide) typically are used to manufacture polyglycols for such uses because these monomers increase the hydrophobic character of the polyglycols and lower their cloud point temperature in water. Unfortunately, the use of 1,2-alkylene oxide monomers results in the introduction of short alkyl side groups into the resulting polyglycol, which severely reduces the biodegradability of the polyglycol.

It would be desirable if more biodegradable polyglycols were developed for use during drilling operations.

SUMMARY OF THE INVENTION

The present invention provides drilling, drill-in, or completion fluids comprising substantially linear heteropolyglycols in an amount effective to perform a function selected from the group consisting of polymer stabilization, shale stabilization, and a combination thereof.

BRIEF DESCRIPTION OF THE INVENTION

The present invention provides substantially linear heteropolyglycols with desired hydrophobicity and low cloud point temperatures in water which are more biodegradable than currently used heteropolyglycols having similar properties. The biodegradability of the heteropolyglycols is increased by using alpha-omega alkylene diols in place of 1,2-propylene oxide and 1,2-butylene oxide when making the polyglycols. The result is a substantially linear heteropolyglycol which is more easily digested by microorganisms.

The heteropolyglycols of the present invention may be used in substantially any drilling, drill-in, or completion fluid, preferred fluids having water as a continuous phase. Preferred drilling and completion fluids for use in the present invention are brines having a density of at least about 8.3 lb/gal. The fluids can contain substantially any suitable salts, including, but not necessarily limited to salts based on metals, such as calcium, magnesium, sodium, potassium, cesium, zinc, aluminum, and lithium. The salt may contain substantially any anions, with preferred anions being less expensive anions including, but not necessarily limited to chlorides, bromides, formates, propionates, sulfates, acetates, carbonates, and nitrates.

The water-base drilling fluids may contain "water-soluble polymers," defined as polymers that are capable of viscosifying a drilling fluid and/or providing filtration control for a drilling fluid, preferably a brine. Such polymers are known in the art. Preferred polymers are non-toxic polymers which include, but are not limited to water soluble starches and derivatized versions thereof, water soluble gums and derivatized versions thereof, and water soluble celluloses. Starches that are suitable for use in the present invention include, but are not necessarily limited to corn based and potato based starches, preferred starches being more temperature stable starches. Gums that are suitable for use in the present invention include, but are not limited to xanthan gums, wellan gums, scleroglucan gums, and guar gums. These polymers are widely available from commercial sources.

As used herein, the terms "derivatized starches" and derivatized gums, refer to starches and gums that have been derivatized in a manner that renders them inherently non-fermentable in order to avoid the need for a preservative. Water-soluble "derivatized starches" and "derivatized gums" that should operate successfully as water-soluble polymers in brines include, but are not necessarily limited to: hydroxyalkyl starches and gums; starch and gum esters; cross-link starches and gums; hypochlorite oxidized starches and gums; starch and gum phosphate monoesters; cationic starches and gums; starch and gum xanthates; and, dialdehyde starches and gums. These derivatized starches and gums can be manufactured using known means, such as those set forth in detail in Chapter X of *Starch: Chemistry an Technology* 311–388 (Roy 1. Whistler, et al. Eds., 1984), incorporated herein by reference.

Specific examples of suitable derivatized starches and gums that fall within the foregoing categories include, but are not limited to: carboxymethyl starches and gums; hydroxyethyl starches and gums; hydroxypropyl starches and gums; hydroxybutyl starches and gums; carboxymethylhydroxyethyl starches and gums; hydroxybutyl starches and gums; carboxymethylhydroxyethyl starches and gums; carboxymethyl hydroxypropyl starches and gums; carboxymethylhydroxybutyl starches and gums; polyacrylamide starches and gums; and, other starch and gum copolymers. A preferred polymer is a derivatized starch known as DFE-124, an experimental polymer produced by Chemstar, Minneapolis, Minn.

Bridging or weighting agents preferably should be added to bridge the pores in the formation. Suitable bridging or weighting agents include, but are not necessarily limited to ground marble or calcium carbonate particles, such as MIL-CARB, available from Baker Hughes INTEQ. Preferred calcium carbonate particles have a mean particle size of about 30 microns. Calcium carbonate has the advantage that it is acid soluble, and therefore can be removed from the formation by acid flushing. If calcium carbonate is used as the bridging agent, about 30 pounds should be used per barrel of brine.

In order to achieve the desired polymer stabilization and/or shale stabilization, the fluid should contain at least about 1 vol % of the heteropolyglycol, preferably at least about 2 vol %, more preferably in the range of from about 2 to about 10 vol %.

Preferred heteropolyglycols have a molecular weight in the range of from about 120 to about 100,000, most preferably in the range of from about 120 to about 2000. The heteropolyglycol preferably is a copolymer of ethylene oxide (EO) with a linear alpha omega diol having in the range of from about 3 to about 20 carbon atoms, preferably in the range of from about 3 to about 6 carbon atoms, and combinations thereof. Most preferred heteropolyglycols consist essentially of EO and a linear alpha omega diol selected from the group consisting of 1,3-propylene glycol, 1,4butylene glycol, and a combination thereof Alternately, EO can be reacted with tetrahydrofuran to produce the heteropolyglycol. A preferred ratio of EO to linear alpha omega diol is 1.

The heteropolyglycols may be added to the brine or fluid using any suitable means. High shear is not necessary. Even simply shaking the mixture by hand is sufficient to form the dispersions of the present invention. Dispersions of more viscous or solid glycols may be facilitated by first dissolving the glycol in freshwater, and then adding the freshwater solution to the brine.

The heteropolyglycols of the present invention can be made using any number of processes. One such process is the process described in U.S. Pat. No. 4,228,272, incorporated herein by reference. According to this process, a slurry is formed containing THF and an amount in the range of from about 5 wt % to abut 20 wt % of an acid-activated montmorillonite clay catalyst. A mixture of THF and ethylene oxide (EO) is formed in proportions sufficient to give a copolymer having a desired ratio of THF/ethylene oxide. To this mixture is added in the range of from about 0.2 to about 6% by weight of a chain terminator, such as water, 1,4-butanediol, ethylene glycol, 1,6-hexanediol, trimethlolpropane, glycerine, and pentaerythritol. Enough of the resulting mixture is added to the clay slurry to give a clay concentration in the range of from about 3 wt % to about 25 wt %, preferably in the range of from about 5 to about 20 wt %. The resulting reaction mass is held at a temperature in the range of from about 40° C., to about 90° C., preferably in the range of from about 68° C. to about 80° C., with constant stirring, until a polymerizate having the desired molecular weight is obtained, as determined by periodic sampling and spectroscopic analysis. The required time ordinarily is in the range of from about 30 to about 240 minutes. Thereafter, the clay is separated from the reaction mass by filtration, decantation, or centrifugation, and unreacted THF is separated from the mixture by distillation, leaving behind the THF/EO polymerizate.

The THF used in the process can be any kind of THF ordinarily used to prepare THF/alkylene oxide polymerizates. The clay is an acid-activated montmorillonite having: a pore volume in the range of from about 0.4 to about 0.8 cubic centimeter grams; a surface area of in the range of from about 220 to about 260 square meters per gram; and, an average pore diameter of in the range of from about 0.1 to about 0.3 microns. It should be understood that these figures are composites and represent characteristics attributable to both the montmorillonite fraction of the clay and to the $SiO_2$ (alpha-quartz) fraction. One commercially available clay having such characteristics is a naturally occurring montmorillonite sold by S/UMI/u/d-Chemie A. G. of Munich, Germany as AKO. This clay is supplied in the acid-activated form and can be used as received.

Pore volume, surface area, and average pore diameter are determined by procedures described in "Experimental Methods in Catalytic Research," edited by Robert B. Anderson, Academic Press, 1968, incorporated herein by reference. In particular, surface area is measured with a Perkin-Elmer 212C or 212C Sorptometer, using the fixed pressure flow principle, as described on pages 72–74; pore volume is measured by the mercury intrusion method described on pages 80 and 81; and, average pore diameter is measured as described on page 68.

The process preferably is run in a continuous fashion, during which the same relative amounts of catalyst and reactants, and the same temperatures and reaction times are used as in the batch mode. A slurry of clay is first prepared in a 50–60%, by weight, solution of batch-prepared polymerizate in THF. This slurry is stirred, heated to the reaction temperature and held there, with stirring, while a mixture of THF, ethylene oxide and chain terminator, in the desired proportions, is slowly added. After a suitable residence time, the product is withdrawn from the reaction zone, to give a THF/ethylene oxide polymerizate containing in the range of from about 4 wt % to about 8 wt % oligomeric cyclic ethers.

The clay catalyst can be held in the reaction zone by suitable filters or screens. Some catalyst attrition may occur as the reaction proceeds and it may therefore be advisable to add an amount of clay in the range of from about 3 wt % to about 5 wt % of the reaction mass every 24 hours of reaction time.

In a preferred embodiment, the reaction product is purified by hydrogenation during which the oligomeric cyclic ethers are reduced to alcohols, and impurities are removed. Purification involves hydrogenation at temperatures up to 250° C., preferably at temperatures in the range of from about 50° C. to about 250° C., under normal pressure or elevated pressure up to 300 bar. The advantages of using elevated pressures instead of normal pressure are comparatively slight, and preferred hydrogen pressures are in the range of from about 10 bar to about 100 bar.

Suitable hydrogenation catalysts are the metals of sub-group 8A, particularly nickel, cobalt, and iron, and the noble metals ruthenium, palladium, and platinum, and also copper. The metals can be used in the pure form, as the Raney metals for instance, as mixtures, or for example, as reduced oxides. The catalysts have suitable support, such as alumina, silica, pumice, bentonite, or magnesium silicate. Catalysts containing the metals iron, cobalt, nickel, or copper are the best converted to the active form by reduction with hydrogen before use, but this operation is mostly superfluous in the case of catalysts containing noble metals.

The catalytic hydrogenation is carried out in the usual way. Work is carried out in the liquid phase; fixed-bed catalyst and trickle or rising flow can be used, for instance, but hydrogenation also may be performed with suspended catalysts. It is particularly advantageous to treat the polyetherdiol with oxygen before hydrogenating the catalyst. The treatment is carried out at a temperature in the range of from about 20° C. to about 150° C., preferably in the range of from about 20° C., to about 50° C., and the ratio of the mass of oxygen to the mass of polyetherdiol is in the range of from about 0.02% to about 0.5%, preferably in the range of from about 0.05% to about 0.3%. This pretreatment is applied to the crude solution of the polyetherdiol in tetrahydrofuran. The oxygen pretreatment considerably reduces the time required for successful purification by hydrogenation. In place of pure oxygen it is possible to use a gas mixture containing oxygen, for instance air.

Many modifications may be made to the present invention without departing from the spirit and scope of the present invention. The embodiment described herein is meant to be illustrative only and should not be taken as limiting the invention, which is defined in the following claims.

I claim:

1. A fluid selected from the group consisting of a drilling, a drill-in, and a completion fluid, said fluid comprising as an integral component one or more water-soluble polymers and one or more substantially linear heteropolyglycols, said heteropolyglycols being present in an amount effective to perform a function selected from the group consisting of polymer stabilization, shale stabilization, and a combination thereof.

2. A fluid selected from the group consisting of a drilling, a drill-in, and a completion fluid, said fluid comprising as an integral component one or more water-soluble polymers and one or more substantially linear heteropolyglycols, said heteropolyglycols being present in an amount effective to perform a function selected from the group consisting of polymer stabilization, shale stabilization, and a combination thereof, wherein said heteropolyglycol consists essentially of monomers selected from the group consisting of ethylene oxide and linear alpha-omega alkylene diols.

3. The fluid of claim 1 wherein said heteropolyglycol consists essentially of monomers selected from the group consisting of ethylene oxide and alpha-omega butylene-1,4-diol.

4. The fluid of claim 1 wherein said fluid comprises water as a continuous phase.

5. The fluid of claim 2 wherein said fluid comprises water as a continuous phase.

6. The fluid of claim 3 wherein said fluid comprises water as a continuous phase.

7. The fluid of claim 1 wherein said heteropolyglycol has a molecular weight in the range of from about 120 to about 2000.

8. The fluid of claim 2 wherein said heteropolyglycol has a molecular weight in the range of from about 120 to about 2000.

9. The fluid of claim 3 wherein said heteropolyglycol has a molecular weight in the range of from about 120 to about 2000.

10. The fluid of claim 4 wherein said heteropolyglycol has a molecular weight in the range of from about 120 to about 2000.

11. The fluid of claim 5 wherein said heteropolyglycol has a molecular weight in the range of from about 120 to about 2000.

12. The fluid of claim 6 wherein said heteropolyglycol has a molecular weight in the range of from about 120 to about 2000.

13. The fluid of claim 2 wherein said linear alpha-omega diol has in the range of from about 3 to about 4 carbon atoms.

14. The fluid of claim 4 wherein said linear heteropolyglycol comprises an alpha-omega diol which has in the range of from about 3 to about 4 carbon atoms.

15. The fluid of claim 10 wherein said linear heteropolyglycol comprises an alpha-omega diol which has in the range of from about 3 to about 4 carbon atoms.

16. The fluid of claim 11 wherein said linear alpha-omega diol has in the range of from about 3 to about 4 carbon atoms.

17. A method for increasing the biodegradability of a fluid selected from the group consisting of a drilling, a drill-in, and a completion fluid, said method comprising adding to said fluid an amount of a substantially linear heteropolyglycol effective to achieve a function selected from the group consisting of polymer stabilization, shale stabilization, and a combination thereof.

18. The method of claim 17 wherein said heteropolyglycol consists essentially of monomers selected from the group consisting of ethylene oxide and linear alpha-omega alkylene diols.

19. The method of claim 17 wherein said heteropolyglycol consists essentially of monomers selected from the group consisting of ethylene oxide and alpha-omega butylene-1,4-diol.

20. The method of claim 17 wherein said fluid comprises water as a continuous phase.

* * * * *